US011381730B2

(12) United States Patent
Feng et al.

(10) Patent No.: US 11,381,730 B2
(45) Date of Patent: Jul. 5, 2022

(54) FEATURE-BASED IMAGE AUTOFOCUS

(71) Applicant: QUALCOMM Incorporated, San Diego, CA (US)

(72) Inventors: Wen-Chun Feng, New Taipei (TW); Hui Shan Kao, New Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 16/912,634

(22) Filed: Jun. 25, 2020

(65) Prior Publication Data

US 2021/0409609 A1    Dec. 30, 2021

(51) Int. Cl.
*H04N 5/232*    (2006.01)
*H04N 9/73*    (2006.01)
*G06V 40/16*    (2022.01)

(52) U.S. Cl.
CPC ..... *H04N 5/232122* (2018.08); *G06V 40/165* (2022.01); *G06V 40/166* (2022.01); *G06V 40/171* (2022.01); *H04N 9/73* (2013.01)

(58) Field of Classification Search
CPC ....... H04N 5/232122; H04N 5/232123; H04N 5/23219; H04N 5/23254; H04N 5/23258; H04N 5/232; H04N 5/23212; H04N 5/232127; H04N 5/23218; H04N 5/23245; H04N 5/23267; H04N 5/23287; H04N 5/23216; H04N 5/23293; H04N 5/23296; H04N 9/73; G06V 40/165; G06V 40/166; G06V 40/171; G06V 40/103; G06V 10/25; G06V 10/255; G06T 2207/10016; G06T 2207/20201; G06T 2207/30201; G06T 2207/10024; G06T 7/246; G06T 5/003; G06T 7/20; G06T 7/73
See application file for complete search history.

(56) References Cited

U.S. PATENT DOCUMENTS

| | | | | |
|---|---|---|---|---|
| 9,380,206 | B2 * | 6/2016 | Miyamoto | H04N 5/23238 |
| 10,129,456 | B1 * | 11/2018 | Kim | H04N 5/23212 |
| 11,082,661 | B1 * | 8/2021 | Pollefeys | H04N 7/152 |
| 2013/0058579 | A1 * | 3/2013 | Kawanishi | G06F 16/583 382/195 |
| 2014/0085451 | A1 * | 3/2014 | Kamimura | H04N 5/23219 348/78 |
| 2014/0362230 | A1 * | 12/2014 | Bulan | G06V 20/00 348/169 |
| 2015/0085179 | A1 * | 3/2015 | Van Heugten | G02B 7/38 348/349 |

(Continued)

*Primary Examiner* — Michael S Osinski
(74) *Attorney, Agent, or Firm* — Qualcomm Incorporated

(57) ABSTRACT

Methods, systems, and devices for feature-based image autofocus are described. A device may perform an autofocus procedure that includes determining a set of features based on determining a feature region associated with an image. The device may generate a feature weight map based on the set of features and estimate a direction of a target feature in the feature region. The device may generate a direction weight map that corresponds to the feature region. The device may determine a focus position of the image based on the generated feature weight map and the estimated direction of the target feature and perform an autofocus operation on the determined focus position of the image. The device may calculate a focus value based on the feature weight map, and the focus position of the image may be based on the focus value.

20 Claims, 11 Drawing Sheets

(56) References Cited

U.S. PATENT DOCUMENTS

| | | | |
|---|---|---|---|
| 2016/0165139 A1* | 6/2016 | Takayanagi | H04N 5/23261 348/208.4 |
| 2016/0301858 A1* | 10/2016 | Aoyama | H04N 5/145 |
| 2017/0076148 A1* | 3/2017 | Sashida | G06V 20/52 |
| 2017/0163997 A1* | 6/2017 | Haruna | G06T 7/246 |
| 2017/0228887 A1* | 8/2017 | Sekimoto | G06F 3/00 |
| 2018/0063436 A1* | 3/2018 | Miyazawa | H04N 5/2328 |
| 2018/0158195 A1* | 6/2018 | Ono | H04N 5/2254 |
| 2018/0278848 A1* | 9/2018 | Nishiyama | H04N 5/23254 |
| 2019/0132518 A1* | 5/2019 | Kon | H04N 5/23245 |
| 2019/0260925 A1* | 8/2019 | Hayasaka | H04N 13/232 |
| 2019/0273860 A1* | 9/2019 | Miyazawa | H04N 5/232127 |
| 2019/0340780 A1* | 11/2019 | Hiraide | G06T 7/73 |
| 2020/0213482 A1* | 7/2020 | Kobayashi | H04N 5/232941 |
| 2020/0228726 A1* | 7/2020 | Misawa | H04N 5/23245 |
| 2020/0267319 A1* | 8/2020 | Yaguchi | H04N 5/23254 |
| 2020/0404134 A1* | 12/2020 | Ichimiya | H04N 5/22521 |
| 2021/0075952 A1* | 3/2021 | Nakada | H04N 5/2351 |
| 2021/0084226 A1* | 3/2021 | Yaguchi | H04N 5/23258 |
| 2021/0203838 A1* | 7/2021 | Tsuji | H04N 5/23212 |
| 2021/0203850 A1* | 7/2021 | Konishi | H04N 5/23218 |
| 2021/0203856 A1* | 7/2021 | Hirose | H04N 5/23216 |
| 2021/0266467 A1* | 8/2021 | Chen | G05D 1/0088 |
| 2021/0282630 A1* | 9/2021 | Kikuchi | H04N 5/23254 |
| 2021/0377432 A1* | 12/2021 | Hayasaka | H04N 5/76 |
| 2021/0397859 A1* | 12/2021 | Arora | G06V 40/19 |
| 2022/0091676 A1* | 3/2022 | Oishi | H04N 5/92 |

\* cited by examiner

800

FEATURE-BASED IMAGE AUTOFOCUS

BACKGROUND

Multimedia systems are widely deployed to provide various types of multimedia communication content such as voice, video, packet data, messaging, broadcast, and so on. These multimedia systems may be capable of processing, storage, generation, manipulation and rendition of multimedia information. Examples of multimedia systems include entertainment systems, information systems, virtual reality systems, model and simulation systems, and so on. These systems may employ a combination of hardware and software technologies to support processing, storage, generation, manipulation and rendition of multimedia information, for example, such as capture devices, storage devices, communication networks, computer systems, and display devices. Some devices may support autofocus procedures to improve a focus quality of an image. These autofocus procedures may be based on an image texture, but some images may have limited amounts of texture, which may yield images of poor focus quality.

SUMMARY

Various aspects of the described techniques relate to feature-based image autofocus and improving a focus of an image. A device may perform an autofocus procedure that includes determining a set of features (e.g., facial features, object features) based on determining a feature region associated with the image. The device may generate a feature weight map based on the set of features and estimate a direction of a target feature in the feature region based on determining the feature region. The device may determine a focus position of the image based on the generated feature weight map and the estimated direction of the target feature, and may perform an autofocus operation on the determined focus position of the image.

A method of autofocus at a device is described. The method may include determining a set of features based on determining a feature region associated with the image, generating a feature weight map based on the set of features, estimating a direction of a target feature in the feature region based on the feature region, determining a focus position of the image based on the generated feature weight map and the estimated direction of the target feature, and performing an autofocus operation on the determined focus position of the image.

An apparatus for autofocus is described. The apparatus may include a processor, memory coupled with the processor, and instructions stored in the memory. The instructions may be executable by the processor to cause the apparatus to determine a set of features based on determining a feature region associated with the image, generate a feature weight map based on the set of features, estimate a direction of a target feature in the feature region based on the feature region, determine a focus position of the image based on the generated feature weight map and the estimated direction of the target feature, and perform an autofocus operation on the determined focus position of the image.

Another apparatus for autofocus is described. The apparatus may include means for determining a set of features based on determining a feature region associated with the image, means for generating a feature weight map based on the set of features, means for estimating a direction of a target feature in the feature region based on the feature region, means for determining a focus position of the image based on the generated feature weight map and the estimated direction of the target feature, and means for performing an autofocus operation on the determined focus position of the image.

A non-transitory computer-readable medium storing code for autofocus at a device is described. The code may include instructions executable by a processor to determine a set of features based on determining a feature region associated with the image, generate a feature weight map based on the set of features, estimate a direction of a target feature in the feature region based on the feature region, determine a focus position of the image based on the generated feature weight map and the estimated direction of the target feature, and perform an autofocus operation on the determined focus position of the image.

Some examples of the method, apparatuses, and non-transitory computer-readable medium described herein may further include operations, features, means, or instructions for calculating a focus value based on the feature weight map, where determining the focus position includes determining the focus position of the image based at least in part on the calculated focus value.

Some examples of the method, apparatuses, and non-transitory computer-readable medium described herein may further include operations, features, means, or instructions for performing a contrast autofocus operation or a phase-detection autofocus operation, or both, based on the set of features, where calculating the focus value includes calculating the focus value based at least in part on the contrast autofocus operation or the phase-detection autofocus operation, or both.

Some examples of the method, apparatuses, and non-transitory computer-readable medium described herein may further include operations, features, means, or instructions for calculating a geometric relationship between a first feature in the feature region and a second feature in the feature region, where estimating the direction of the target feature includes estimating the direction of the target feature in the feature region based at least in part on the geometric relationship between the first feature in the feature region and the second feature in the feature region, wherein the first feature is different from the second feature.

In some examples of the method, apparatuses, and non-transitory computer-readable medium described herein, the geometric relationship includes a Euclidian distance, a Chebyshev distance, or a cosine similarity, any combination thereof.

Some examples of the method, apparatuses, and non-transitory computer-readable medium described herein may further include operations, features, means, or instructions for estimating the location of a third feature in the feature region based on the geometric relationship between the first feature in the feature region and the second feature in the feature region, where estimating the direction of the target feature includes estimating the direction of the target feature in the feature region based at least in part on the location of the third feature in the feature region.

Some examples of the method, apparatuses, and non-transitory computer-readable medium described herein may further include operations, features, means, or instructions for updating the feature region associated with the image based on the estimated direction of the target feature, where determining the focus position of the image includes determining the focus position of the image based at least in part on the updated feature region.

Some examples of the method, apparatuses, and non-transitory computer-readable medium described herein may further include operations, features, means, or instructions for performing an auto white balance operation based on the set of features, where calculating the focus value includes calculating the focus value based at least in part on the auto white balance operation.

Some examples of the method, apparatuses, and non-transitory computer-readable medium described herein may further include operations, features, means, or instructions for determining a presence of a facial feature or an object feature in the feature region associated with the image based on the auto white balance operation, the target feature including the facial feature or the object feature, where performing the auto white balance operation includes performing the auto white balance operation based at least in part on the presence of the facial feature or the object feature in the feature region.

In some examples of the method, apparatuses, and non-transitory computer-readable medium described herein, the feature region includes an object or a person.

In some examples of the method, apparatuses, and non-transitory computer-readable medium described herein, the set of features includes a set of facial features of a person and the set of facial features including a face of the person, one or more eyes of the person, a nose of the person, one or more ears of the person, a mouth of the person, or any combination thereof.

In some examples of the method, apparatuses, and non-transitory computer-readable medium described herein, the set of features includes a set of object features of an object and the set of object features including a surface of the object, a shape of the object, or a size of the object, or any combination thereof.

In some examples of the method, apparatuses, and non-transitory computer-readable medium described herein, the object includes a roadside object.

In some examples of the method, apparatuses, and non-transitory computer-readable medium described herein, the feature includes a bounding box including the set of features in the image.

In some examples of the method, apparatuses, and non-transitory computer-readable medium described herein, determining the set of features may include operations, features, means, or instructions for determining the set of features based on a principal component analysis, a linear discriminant analysis, an elastic bunch graph matching, a dynamic link matching, a hidden Markov model, or an artificial neural network technique, or any combination thereof.

DETAILED DESCRIPTION

A device may perform an autofocus procedure to calculate an image focus value based on a strength of features in an image, such as facial features of a person in the image. An image target (e.g., a person's face, a roadside object, etc.) with a higher-degree of texture may achieve a better focus performance compared to an image target with a lower-degree of texture. In some cases, one or more target features associated with the image target may be smooth and have little texture, while in some other cases, the one or more target features may be covered or obstructed. Some other different autofocus procedures may generate images that are out-of-focus when applied to images that have smooth or obstructed features, and some other different autofocus procedures may identify an image target and apply the autofocus procedure to an entire feature region without taking the target features into account, which may yield an out-of-focus image.

Various aspects of the described techniques herein relate to an autofocus procedure to improve a focus quality of an image. A device may identify a feature region of an image and extract one or more target features of the feature region. The device may determine an orientation and/or a direction of a target feature or the feature region based on at least one target feature. In some cases, the device may determine the direction of the feature region based on a geometric relationship between target features, and in some additional or alternative cases, the device may generate a feature weight map and a direction weight map. The feature weight map may include a number of weights that indicate strengths of target features in the feature region. The direction weight map may include a number of weights that indicate locations of target features within the feature region.

The direction weight map may be based on evaluating one or more target features. For example, the device may map a pseudo target feature onto the image based on a geometric relationship with one or more additional target features. The feature weight map and the direction weight map can be used to calculate a focus position of the image, which may yield improved image focus and quality. The target features may be weighted based on the direction of the feature region, and target features with higher weights may contribute more to autofocus evaluation than target features with lower weights. By identifying target features of the feature region and a direction of the feature region, the device may determine a focus position of the image that improves the focus quality of the feature region.

Aspects of the disclosure are initially described in the context of a multimedia system. Aspects of the disclosure are then described with reference to weight maps and flow diagrams. Aspects of the disclosure are further illustrated by and described with reference to apparatus diagrams, system diagrams, and flowcharts that relate to feature-based image autofocus.

Figure 1:
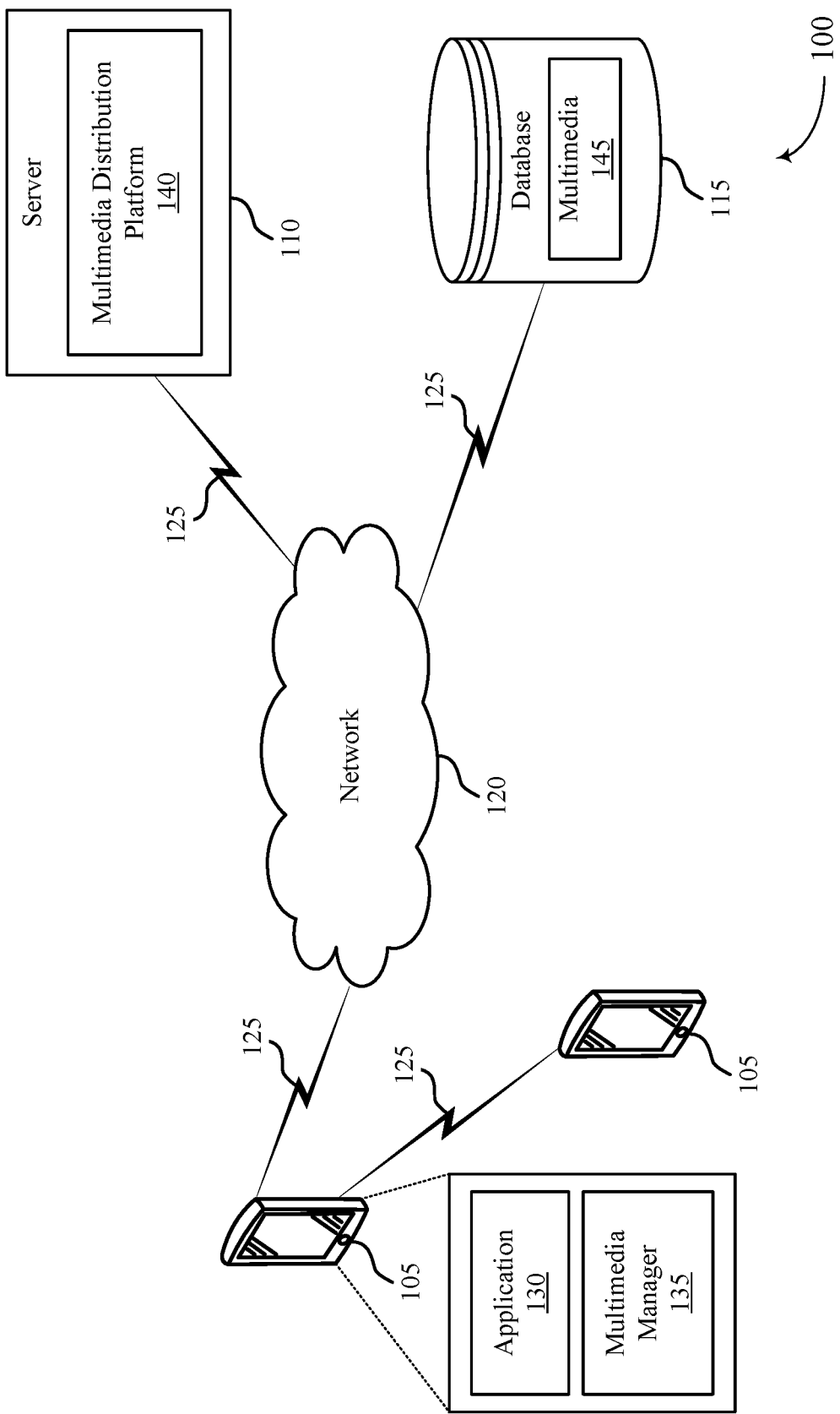
FIG. 1 illustrates an example of a multimedia system that supports feature-based image autofocus in accordance with aspects of the present disclosure.

FIG. 1 illustrates a multimedia system 100 for a device that supports feature-based image autofocus in accordance with aspects of the present disclosure. The multimedia system 100 may include devices 105, a server 110, and a database 115. Although, the multimedia system 100 illustrates two devices 105, a single server 110, a single database 115, and a single network 120, the present disclosure applies to any multimedia system architecture having one or more devices 105, servers 110, databases 115, and networks 120. The devices 105, the server 110, and the database 115 may communicate with each other and exchange information that supports feature-based image autofocus, such as multimedia packets, multimedia data, or multimedia control information, via network 120 using communications links 125. In some cases, a portion or all of the techniques described herein supporting feature-based image autofocus may be performed by the devices 105 or the server 110, or both.

A device 105 may be a cellular phone, a smartphone, a personal digital assistant (PDA), a wireless communication device, a handheld device, a tablet computer, a laptop computer, a cordless phone, a display device (e.g., monitors), and/or the like that supports various types of communication and functional features related to multimedia (e.g., transmitting, receiving, broadcasting, streaming, sinking, capturing, storing, and recording multimedia data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands (e.g., multimedia-related information).

The devices 105 may include an application 130 and a multimedia manager 135. While, the multimedia system 100 illustrates the devices 105 including both the application 130 and the multimedia manager 135, the application 130 and the multimedia manager 135 may be an optional feature for the devices 105. In some cases, the application 130 may be a multimedia-based application that can receive (e.g., download, stream, broadcast) from the server 110, database 115 or another device 105, or transmit (e.g., upload) multimedia data to the server 110, the database 115, or to another device 105 via using communications links 125.

The multimedia manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the multimedia manager 135 may process multimedia (e.g., image data, video data, audio data) from and/or write multimedia data to a local memory of the device 105 or to the database 115.

The multimedia manager 135 may also be configured to provide multimedia enhancements, multimedia restoration, multimedia analysis, multimedia compression, multimedia streaming, and multimedia synthesis, among other functionality. For example, the multimedia manager 135 may perform white balancing, cropping, scaling (e.g., multimedia compression), adjusting a resolution, multimedia stitching, color processing, multimedia filtering, spatial multimedia filtering, artifact removal, frame rate adjustments, multimedia encoding, multimedia decoding, and multimedia filtering. By further example, the multimedia manager 135 may process multimedia data to support feature-based image autofocus, according to the techniques described herein.

The device 105 may capture an image and perform a feature-based autofocus procedure on the image. In some cases, an image captured by the device 105 may include one or more feature regions (e.g., faces, roadside objects, etc.), and a feature region may include target features. A target feature may include a distinguishing feature of the image, and the feature region may include a group of target features. For example, target features may include an eye, a nose, a mouth, an eyebrow, etc., and a feature region may include a region of the image that includes or bounds the eye, nose, mouth, and eyebrow. In some additional or alternative examples, target features may include a first letter on a roadside sign, a second letter on a roadside sign, a background color of a roadside sign, etc., and a feature region may include a region of the image that includes or bounds the first letter of the roadside sign, the second letter of the roadside sign, and the background color of the roadside sign.

The device 105 may improve the focus quality of an image based on performing a feature-based autofocus procedure. For example, the device 105 may capture an image of a person, identify a feature region that corresponds to the person's face, determine a number of target features of the feature region as well as an orientation or direction of the feature region, and determine a focus position of the image based on the target features and the direction of the feature region. The techniques described herein may provide improvements in image focus procedures. In some cases, by improving image focus procedures, the operational characteristics, such as power consumption, processor utilization (e.g., DSP, CPU, GPU, ISP processing utilization), and memory usage of the devices 105 may be reduced.

The server 110 may be a data server, a cloud server, a server associated with a multimedia subscription provider, proxy server, web server, application server, communications server, home server, mobile server, or any combination thereof. The server 110 may in some cases include a multimedia distribution platform 140. The multimedia distribution platform 140 may allow the devices 105 to discover, browse, share, and download multimedia via network 120 using communications links 125, and therefore provide a digital distribution of the multimedia from the multimedia distribution platform 140. As such, a digital distribution may be a form of delivering media content such as audio, video, images, without the use of physical media but over online delivery mediums, such as the Internet. For example, the devices 105 may upload or download multimedia-related applications for streaming, downloading, uploading, processing, enhancing, etc. multimedia (e.g., images, audio, video). The server 110 may also transmit to the devices 105 a variety of information, such as instructions or commands (e.g., multimedia-related information) to download multimedia-related applications on the device 105.

The database 115 may store a variety of information, such as instructions or commands (e.g., multimedia-related information). For example, the database 115 may store multimedia 145. The device may support feature-based image autofocus associated with the multimedia 145. The device 105 may retrieve the stored data from the database 115 via the network 120 using communication links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the multimedia system 100 may include uplink transmissions from the device 105 to the server 110 and the database 115, and/or downlink transmissions, from the server 110 and the database 115 to the device 105. The communication links 125 may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

Figure 2:
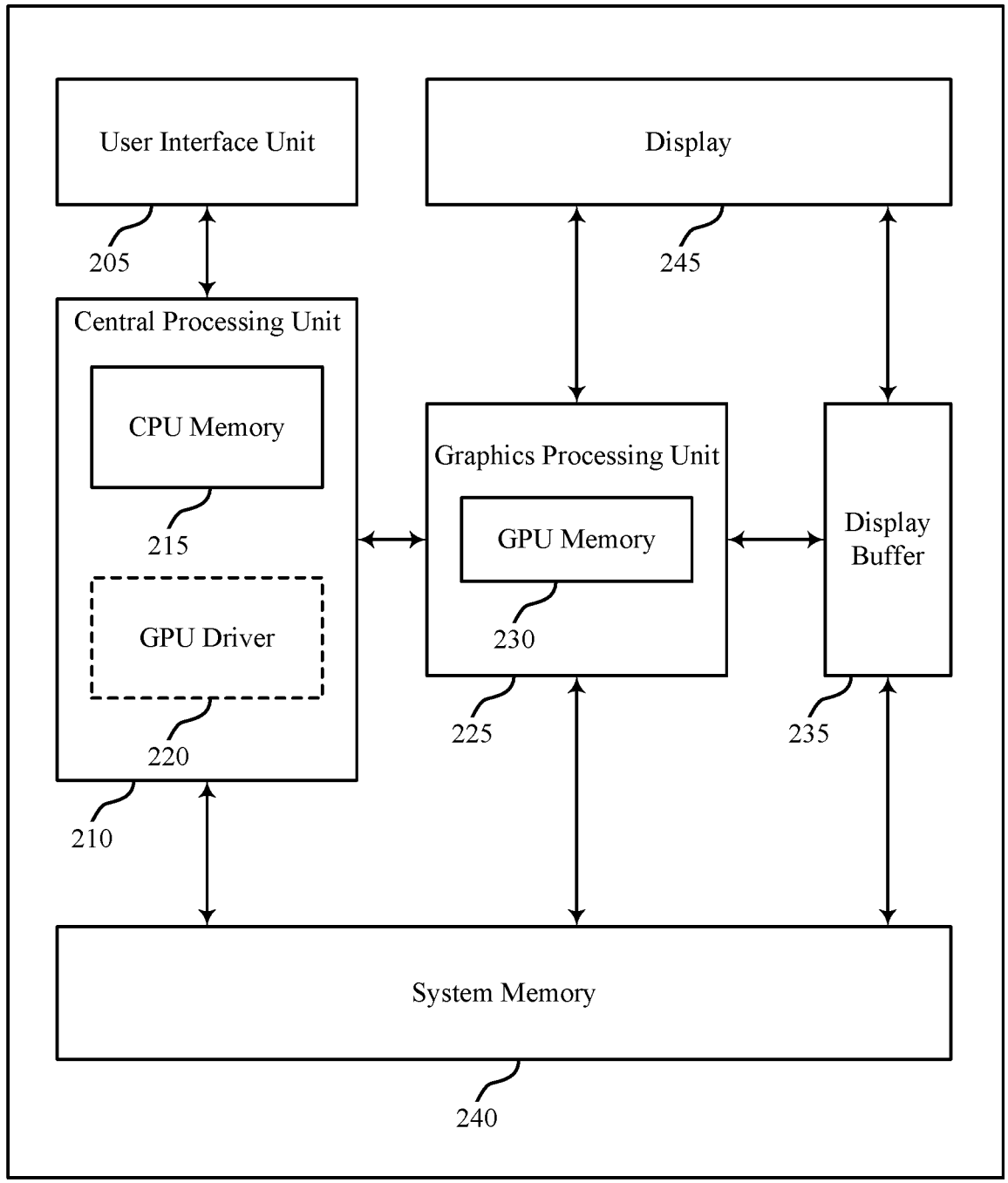
FIG. 2 illustrates an example of a device that supports feature-based image autofocus in accordance with aspects of the present disclosure.

FIG. 2 illustrates an example of a device 200 that supports feature-based image autofocus in accordance with aspects of the present disclosure. In the example of FIG. 2, the device 200 includes a central processing unit (CPU) 210 having a CPU memory 215, a GPU 225 having a GPU memory 230, a display 245, a display buffer 235 storing data associated with rendering, a user interface unit 205, and a system memory 240. For example, the system memory 240 may store a GPU driver 220 (illustrated as being included within the CPU 210 as described below) having a compiler, a GPU program, a locally-compiled GPU program, and the like. The user interface unit 205, the CPU 210, the GPU 225, the system memory 240, and the display 245 may communicate with each other (e.g., using a system bus).

Examples of the CPU 210 include, but are not limited to, a digital signal processor (DSP), general purpose microprocessor, application specific integrated circuit (ASIC), field programmable logic array (FPGA), or other equivalent integrated or discrete logic circuitry. Although the CPU 210 and the GPU 225 are illustrated as separate units in the example of FIG. 2, in some examples, the CPU 210 and the GPU 225 may be integrated into a single unit. The CPU 210 may execute one or more software applications. Examples of the applications may include operating systems, word processors, web browsers, e-mail applications, spreadsheets, video games, audio and/or video capture, playback or editing applications, or other such applications that initiate the generation of image data to be presented via the display 245.

As illustrated, the CPU 210 may include a CPU memory 215. For example, the CPU memory 215 may represent on-chip storage or memory used in executing machine or object code. The CPU memory 215 may include one or more volatile or non-volatile memories or storage devices, such as flash memory, a magnetic data media, an optical storage media, etc. The CPU 210 may be able to read values from or write values to the CPU memory 215 more quickly than reading values from or writing values to the system memory 240, which may be accessed, e.g., over a system bus.

The GPU 225 may represent one or more dedicated processors for performing graphical operations. That is, for example, the GPU 225 may be a dedicated hardware unit having fixed function and programmable components for rendering graphics and executing GPU applications. The GPU 225 may also include a DSP, a general purpose microprocessor, an ASIC, an FPGA, or other equivalent integrated or discrete logic circuitry. The GPU 225 may be built with a highly-parallel structure that provides more efficient processing of complex graphic-related operations than the CPU 210. For example, the GPU 225 may include a plurality of processing elements that are configured to operate on multiple vertices or pixels in a parallel manner. The highly parallel nature of the GPU 225 may allow the GPU 225 to generate graphic images (e.g., graphical user interfaces and two-dimensional or three-dimensional graphics scenes) for the display 245 more quickly than the CPU 210.

The GPU 225 may, in some instances, be integrated into a motherboard of the device 200. In other instances, the GPU 225 may be present on a graphics card that is installed in a port in the motherboard of the device 200 or may be otherwise incorporated within a peripheral device configured to interoperate with the device 200. As illustrated, the GPU 225 may include the GPU memory 230. For example, the GPU memory 230 may represent on-chip storage or memory used in executing machine or object code. The GPU memory 230 may include one or more volatile or non-volatile memories or storage devices, such as flash memory, a magnetic data media, an optical storage media, etc. The GPU 225 may be able to read values from or write values to the GPU memory 230 more quickly than reading values from or writing values to the system memory 240, which may be accessed, e.g., over a system bus. That is, the GPU 225 may read data from and write data to the GPU memory 230 without using the system bus to access off-chip memory. This operation may allow the GPU 225 to operate in a more efficient manner by reducing the need for the GPU 225 to read and write data via the system bus, which may experience heavy bus traffic.

The display 245 represents a unit capable of displaying video, images, text or any other type of data for consumption by a viewer. The display 245 may include a liquid-crystal display (LCD), a light emitting diode (LED) display, an organic LED (OLED), an active-matrix OLED (AMOLED), or the like. The display buffer 235 represents a memory or storage device dedicated to storing data for presentation of imagery, such as computer-generated graphics, still images, video frames, or the like for the display 245. The display buffer 235 may represent a two-dimensional buffer that includes a plurality of storage locations. The number of storage locations within the display buffer 235 may, in some cases, correspond to the number of pixels to be displayed on the display 245. For example, if the display 245 is configured to include 640×480 pixels, the display buffer 235 may include 640×480 storage locations storing pixel color and intensity information, such as red, green, and blue pixel values, or other color values. The display buffer 235 may store the final pixel values for each of the pixels processed by the GPU 225. The display 245 may retrieve the final pixel values from the display buffer 235 and display the final image based on the pixel values stored in the display buffer 235.

The user interface unit 205 represents a unit with which a user may interact with or otherwise interface to communicate with other units of the device 200, such as the CPU 210. Examples of the user interface unit 205 include, but are not limited to, a trackball, a mouse, a keyboard, and other types of input devices. The user interface unit 205 may also be, or include, a touch screen and the touch screen may be incorporated as part of the display 245. The system memory 240 may comprise one or more computer-readable storage media. Examples of the system memory 240 include, but are not limited to, a random access memory (RAM), static RAM (SRAM), dynamic RAM (DRAM), a read-only memory (ROM), an electrically erasable programmable read-only memory (EEPROM), a compact disc read-only memory (CD-ROM) or other optical disc storage, magnetic disc storage, or other magnetic storage devices, flash memory, or any other medium that can be used to store desired program code in the form of instructions or data structures and that can be accessed by a computer or a processor. The system memory 240 may store program components and/or instructions that are accessible for execution by the CPU 210. Additionally, the system memory 240 may store user applications and application surface data associated with the applications. The system memory 240 may in some cases store information for use by and/or information generated by other components of the device 200. For example, the system memory 240 may act as a device memory for the GPU 225 and may store data to be operated on by the GPU 225 as well as data resulting from operations performed by the GPU 225.

In some examples, the system memory 240 may include instructions that cause the CPU 210 or the GPU 225 to perform the functions ascribed to the CPU 210 or the GPU 225 in aspects of the present disclosure. The system memory 240 may, in some examples, be considered as a non-transitory storage medium. The term "non-transitory" should not be interpreted to mean that the system memory 240 is non-movable. As one example, the system memory 240 may be removed from the device 200 and moved to another device. As another example, a system memory substantially similar to the system memory 240 may be inserted into the device 200. In some examples, a non-transitory storage medium may store data that can, over time, change (e.g., in RAM).

The system memory 240 may store a GPU driver 220 and compiler, a GPU program, and a locally-compiled GPU program. The GPU driver 220 may represent a computer program or executable code that provides an interface to access the GPU 225. The CPU 210 may execute the GPU driver 220 or portions thereof to interface with the GPU 225 and, for this reason, the GPU driver 220 is shown in the example of FIG. 2 within the CPU 210. The GPU driver 220 may be accessible to programs or other executables executed by the CPU 210, including the GPU program stored in the system memory 240. Thus, when one of the software applications executing on the CPU 210 calls for graphics processing, the CPU 210 may provide graphics commands and graphics data to the GPU 225 for rendering to the display 245 (e.g., via the GPU driver 220).

The GPU program may include code written in a high level (HL) programming language, e.g., using an application programming interface (API). Examples of APIs include Open Graphics Library ("OpenGL"), DirectX, Render-Man, WebGL, or any other public or proprietary standard graphics API. The instructions may also conform to so-called heterogeneous computing libraries, such as Open-Computing Language ("OpenCL"), DirectCompute, etc. In general, an API includes a predetermined, standardized set of commands that are executed by associated hardware. API commands allow a user to instruct hardware components of the GPU 225 to execute commands without user knowledge as to the specifics of the hardware components. In order to process the graphics rendering instructions, the CPU 210 may issue one or more rendering commands to the GPU 225 (e.g., through the GPU driver 220) to cause the GPU 225 to perform some or all of the rendering of the graphics data. In some examples, the graphics data to be rendered may include a list of graphics primitives (e.g., points, lines, triangles, quadrilaterals, etc.).

The GPU program stored in the system memory 240 may invoke or otherwise include one or more functions provided by the GPU driver 220. The CPU 210 executes the program in which the GPU program is embedded and, upon encountering the GPU program, passes the GPU program to the GPU driver 220. The CPU 210 executes the GPU driver 220 in this context to process the GPU program. That is, for example, the GPU driver 220 may process the GPU program by compiling the GPU program into object or machine code executable by the GPU 225. This object code may be referred to as a locally-compiled GPU program. In some examples, a compiler associated with the GPU driver 220 may operate in real-time or near-real-time to compile the GPU program during the execution of the program in which the GPU program is embedded. For example, the compiler represents a unit that reduces HL instructions defined in accordance with a HL programming language to low-level (LL) instructions of a LL programming language. After compilation, these LL instructions are capable of being executed by specific types of processors or other types of hardware, such as FPGAs, ASICs, and the like (including, but not limited to, the CPU 210 and the GPU 225).

In the example of FIG. 2, the compiler may receive the GPU program from the CPU 210 when executing HL code that includes the GPU program. That is, a software application being executed by the CPU 210 may invoke the GPU driver 220 (e.g., via a graphics API) to issue one or more commands to the GPU 225 for rendering one or more graphics primitives into displayable graphics images. The compiler may compile the GPU program to generate the locally-compiled GPU program that conforms to a LL programming language. The compiler may then output the locally-compiled GPU program that includes the LL instructions. In some examples, the LL instructions may be provided to the GPU 225 in the form a list of drawing primitives (e.g., triangles, rectangles, etc.).

The LL instructions (e.g., which may alternatively be referred to as primitive definitions) may include vertex specifications that specify one or more vertices associated with the primitives to be rendered. The vertex specifications may include positional coordinates for each vertex and, in some instances, other attributes associated with the vertex, such as color coordinates, normal vectors, and texture coordinates. The primitive definitions may include primitive type information, scaling information, rotation information, and the like. Based on the instructions issued by the software application (e.g., the program in which the GPU program is embedded), the GPU driver 220 may formulate one or more commands that specify one or more operations for the GPU 225 to perform in order to render the primitive. When the GPU 225 receives a command from the CPU 210, it may decode the command and configure one or more processing elements to perform the specified operation and may output the rendered data to the display buffer 235.

The GPU 225 receives the locally-compiled GPU program, and then, in some instances, the GPU 225 renders one or more images and outputs the rendered images to the display buffer 235. For example, the GPU 225 may generate a number of primitives to be displayed at the display 245. Primitives may include one or more of a line (including curves, splines, etc.), a point, a circle, an ellipse, a polygon (e.g., a triangle), or any other two-dimensional primitive. The term "primitive" may also refer to three-dimensional primitives, such as cubes, cylinders, sphere, cone, pyramid, torus, or the like. The term "primitive" refers to any basic geometric shape or element capable of being rendered by the GPU 225 for display as an image (or frame in the context of video data) via the display 245. The GPU 225 may transform primitives and other attributes (e.g., that define a color, texture, lighting, camera configuration, or other aspect) of the primitives into a so-called "world space" by applying one or more model transforms (which may also be specified in the state data). Once transformed, the GPU 225 may apply a view transform for the active camera (which again may also be specified in the state data defining the camera) to transform the coordinates of the primitives and lights into the camera or eye space. The GPU 225 may also perform vertex shading to render the appearance of the primitives in view of any active lights. The GPU 225 may perform vertex shading in one or more of the above model, world, or view space.

Once the primitives are shaded, the GPU 225 may perform projections to project the image into a canonical view volume. After transforming the model from the eye space to the canonical view volume, the GPU 225 may perform clipping to remove any primitives that do not at least partially reside within the canonical view volume. That is, the GPU 225 may remove any primitives that are not within the frame of the camera. The GPU 225 may then map the coordinates of the primitives from the view volume to the screen space, effectively reducing the three-dimensional coordinates of the primitives to the two-dimensional coordinates of the screen. Given the transformed and projected vertices defining the primitives with their associated shading data, the GPU 225 may then rasterize the primitives. Rasterization may refer to the task of taking an image described in a vector graphics format and converting it to a raster image (e.g., a pixelated image) for output on a video display or for storage in a bitmap file format.

A GPU 225 may include a dedicated fast bin buffer (e.g., a fast memory buffer, such as GMEM, which may be referred to by the GPU memory 230). As discussed herein, a rendering surface may be divided into bins. In some cases, the bin size is determined by format (e.g., pixel color and depth information) and render target resolution divided by the total amount of GMEM. The number of bins may vary based on the device 200 hardware, target resolution size, and target display format. A rendering pass may draw (e.g., render, write, etc.) pixels into GMEM (e.g., with a high bandwidth that matches the capabilities of the GPU). The GPU 225 may then resolve the GMEM (e.g., burst write blended pixel values from the GMEM, as a single layer, to the display buffer 235 or a frame buffer in the system memory 240). Such may be referred to as bin-based or tile-based rendering. When all bins are complete, the driver may swap buffers and start the binning process again for a next frame.

For example, the GPU 225 may implement a tile-based architecture that renders an image or rendering target by breaking the image into multiple portions, referred to as tiles or bins. The bins may be sized based on the size of the GPU memory 230 (e.g., which may alternatively be referred to herein as GMEM or a cache), the resolution of display 245, the color or Z precision of the render target, etc. When implementing tile-based rendering, the GPU 225 may perform a binning pass and one or more rendering passes. For example, with respect to the binning pass, the GPU 225 may process an entire image and sort rasterized primitives into bins.

The device 200 may represent a smartphone, a tablet, a digital camera, or the like, and may utilize a camera assembly to capture an image. In some cases, the device 200 may store the captured image, while in some additional or alternative cases, the device 200 may transmit the image to a remote device (e.g., a cloud-based storage device). The device 200 may perform a feature-based autofocus procedure on images captured by a camera assembly of the device 200. An image captured by the device 200 may include a feature region that is associated with a number of target features, and the device may generate a feature weight map and estimate the direction of the feature region to improve the focus position of the image. For example, the CPU 210 or the GPU 225 may calculate the focus position of the image based on the feature weight map and the estimated direction of the feature region. In some cases, the display 245 may display the image based on the feature-based autofocus procedure.

Figure 3:
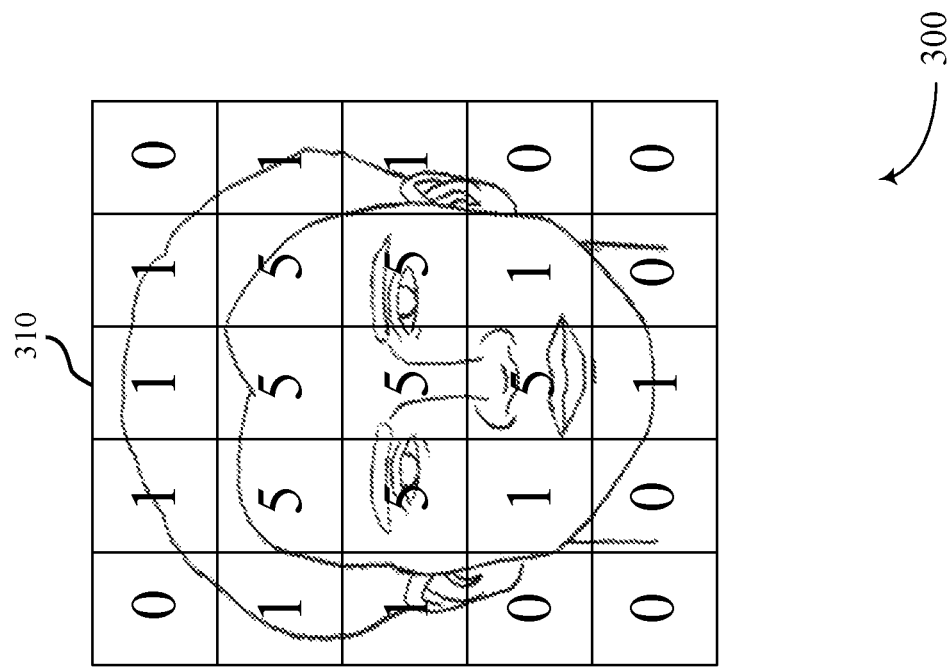
FIG. 3 illustrates an example of a weight map technique that supports feature-based image autofocus in accordance with aspects of the present disclosure.
Figure 3:
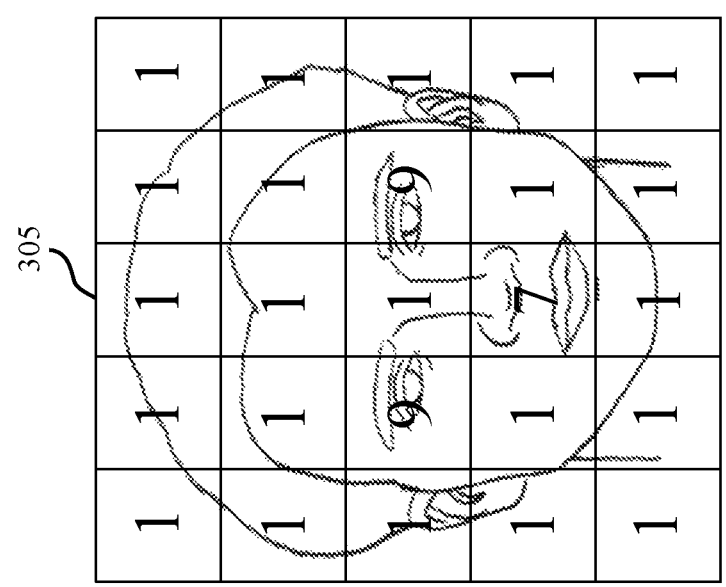

FIG. 3 illustrates an example of a weight map technique 300 that supports feature-based image autofocus in accordance with aspects of the present disclosure. The weight map technique 300 implement aspects of the multimedia system 100 described with reference to FIG. 1, respectively. For example, the weight map technique 300 implemented by a device 105 and may promote high reliability and low latency autofocus operations in the multimedia system 100. The weight map technique 300 may include a feature weight map 305 and a direction weight map 310. The feature weight map 305 and/or the direction weight map 310 may correspond to a feature region of an image.

The device 105 may perform a feature-based autofocus procedure based on the feature weight map 305 and the direction weight map 310. The feature weight map 305 and the direction weight map 310 may both include a number of cells, and each cell of the number of cells may be associated with a weight (e.g., a weight corresponding to a value from 0 to 10). The device 105 may capture or receive an image and identify a feature region (e.g., a region of interest) within the image. The device 105 may identify a position and a size of one or more target features corresponding to the feature region, and generate the feature weight map 305 and the direction weight map 310 based on the position and/or the size of the one or more target features. The feature weight map 305 may correspond to the feature region and include a number of weights that correspond to locations of the feature region. The weights of the feature weight map 305 may be dynamic and support the feature-based autofocus procedure in adapting to various feature region conditions (e.g., facial expressions, facial obstructions such as glasses, hats, scarfs, masks, etc.).

A high weight may correspond to a strong feature (e.g., a feature with significant texture). For example, a high weight may correspond to an important feature. The feature weight map 305 may correspond to a face (e.g., a feature region), and a cell corresponding to a nose feature may be associated with a weight (e.g., a weight value of 7) indicating a strong feature. In some cases, the feature weight map 305 may support an eye-tracking based autofocus procedure. For example, one or more cells of the feature weight map 305 may correspond to eye features that may be associated with a weight (e.g., a weight value of 9) indicating a strong feature. In some cases, the device 105 may configure a compensation value that increases a weight of a cell associated with a facial feature (e.g., eyes), which may improve a focus quality and support eye-tracking procedures.

The device 105 may generate the direction weight map 310 based on an estimated or predicted direction of the feature region. The device 105 may generate the direction weight map 310 based on a geometric relationship between one or more features of the feature region. For example, the device 105 may generate the direction weight map 310 based on the angle between the plane of the eyes and the place between the nose and mouth. In some additional or alternative examples, the device 105 may generate the direction weight map 310 based on a Euclidian distance between the nose and the moth or the position of the mouth with respect to the position of the nose. In some cases, if a target feature (e.g., an eyes, a nose, etc.) does not exist or is obstructed (e.g., covered by sunglasses, covered by a mask, obstructed by glasses, etc.), the device 105 may map a pseudo target feature-based on the geometric relationship with other target features. The pseudo target feature may be used in estimated the direction of the feature region.

The direction weight map 310 may be based on number of defined weight map for different directions. For example, the device 105 may be configured with a direction weight map that corresponds to a face looking left, a direction weight map that corresponds to a face looking down, and the device 105 may generate the direction weight map 310 based on estimating the direction of the feature region and selecting the corresponding direction weight map. In some cases, the estimated direction of the feature region may be based on a feature region evaluator or a feature region detector (e.g., a face detector). The cells of the direction weight map 310 that are associated with target feature of the feature region may correspond to high weight values. For example, if a person is looking to the left, the right side of the direction weight map 310 may correspond to high weight values, as the eyes of the person may be towards the right of the direction weight map 310. As shown in the direction weight map 310, the person is looking forward, so the cells in the center of the grid are associated with higher weights than the cells on the side of the grid.

Portions of the image that are not associated with target features of the feature region may be associated with low weights, which may support the device 105 in refraining from focusing the image based on objects in the background of the image. For example, the cells in the bottom corners of the direction weight map 310 may not be associated with target features of the feature region, so the cells in the bottom corners may be associated with a low weight (e.g., a weight value of 0). The direction weight map 310 may support the device 105 in identifying the corners of the feature region, which may improve the focus quality of the image. In some cases, the feature weight map 305 and the direction weight map 310 may be combined to produce an image weight map. The image weight map may correspond to the feature region and account for both the strength of features and the direction of the feature region. In some examples, the image weight map may be based on multiplying the feature weight map 305 and the direction weight map 310 together. For example, the feature weight map 305 may include the same number of cells as the direction weight map 310, and each cell of the image weight map may include a weight that is the product of the weight of the corresponding cell in the feature weight map 305 and the corresponding cell in the direction weight map 310.

The device 105 may determine a focus position of the image based on the image weight map. The focus position may be determined based on calculating a focus value, and the focus value may be calculated based on the image weight map. As such, the focus position of the image may improve the clarity of image features and enhance image quality. In some examples, techniques described herein may improve an auto white balance procedure, which may prevent the device 105 from falsely identifying a feature region of an image. For example, the device 105 may perform the auto white balance procedure based on the feature region, the feature weight map 305, the direction weight map 310, or the image weight map, which may improve the accuracy of the device 105 in correctly identifying image feature regions.

Figure 4:
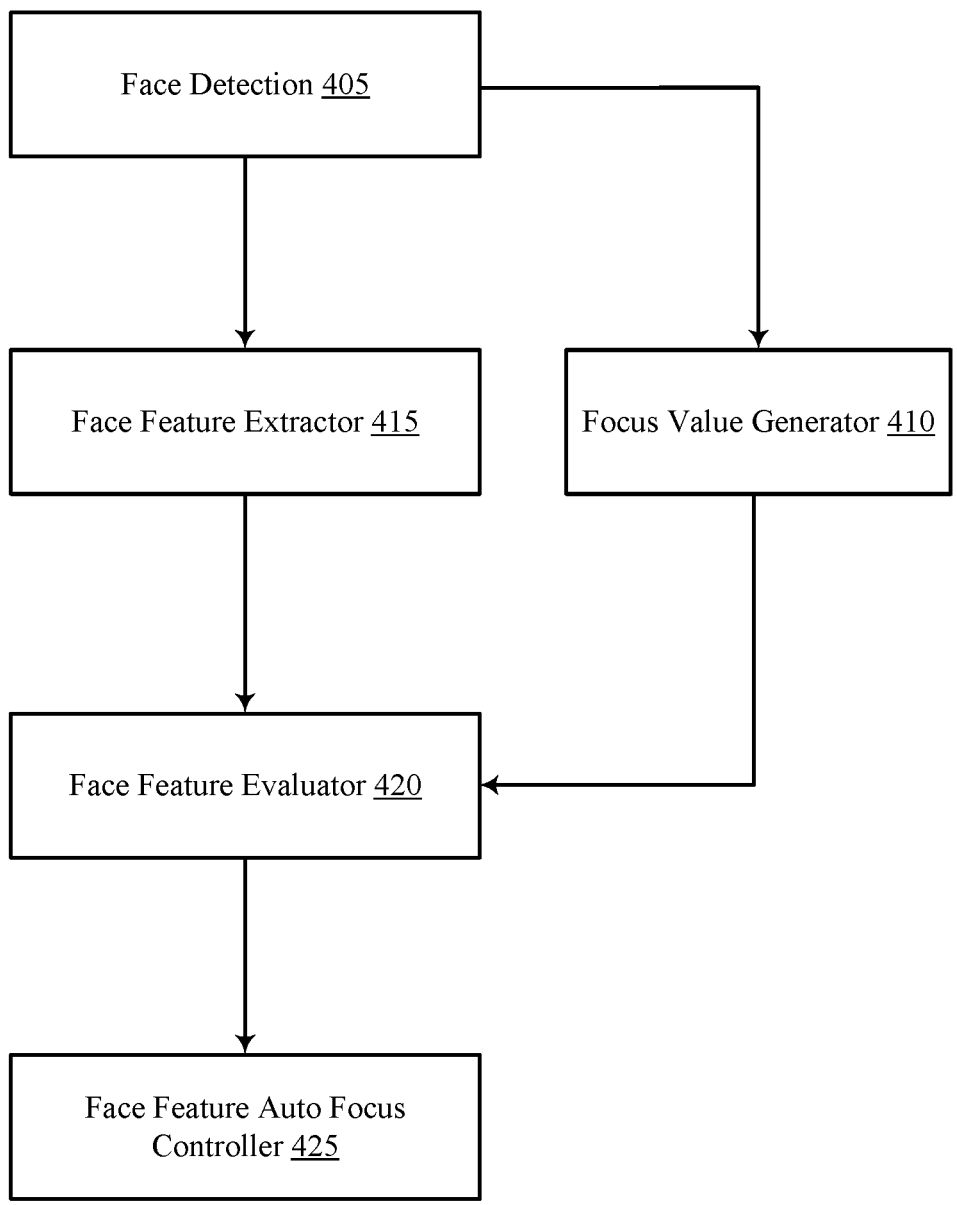
FIG. 4 illustrates an example of a flow diagram that supports feature-based image autofocus in accordance with aspects of the present disclosure.

FIG. 4 illustrates an example of a flow diagram 400 that supports feature-based image autofocus in accordance with aspects of the present disclosure. In some examples, flow diagram 400 may implement aspects of the multimedia system 100. The operation of the flow diagram 400 may be implemented by a device 105 or its components (e.g., one or more image processors, one or more image memory devices, one or more lens motors, one or more image sensor motors, or any combination thereof) as described herein. In some examples, the device 105 may execute a set of instructions to control the functional elements of the device 105 to perform the operations described below. Additionally or alternatively, the device 105 may perform aspects of the operations described below using special-purpose hardware. Alternative examples of the following may be implemented, where some operations are performed in a different order than described or are not performed at all. In some cases, operations may include additional features not mentioned below, or further operations may be added.

At 405, the device 105 may perform a face detection procedure on an image. The device 105 may, based on the face detection procedure, detect a position and a size of a face within the image. The face detection procedure may be a deep neural network and/or discriminative feature learning. In some examples, the device 105 may identify a feature region based on detecting the face or another object (e.g., a roadside object) within the image. At 410, the device 105 may calculate a focus value of a feature region. For example, the device 105 may calculate the focus value based on a contrast autofocus procedure and/or a phase-detection autofocus procedure. The contrast autofocus procedure may include calculating a focus value for each lens stop position of a group of lens stop positions, generating a focus value curve that represents each focus value corresponding to the group of lens stop positions, and selecting a highest focus value (e.g., a height of the focus value curve). The phase detection autofocus procedure may also include calculating a defocus value for each lens stop position in a group of lens stop positions where a sign of the defocus value indicates a direction and the value indicates steps of focus movement, and changing the lens stop position based on the sign and value of the defocus value. A defocus value of null may correspond to an image that is in focus.

At 415, the device 105 may extract a number of target features from the feature region. For example, if the feature region corresponds to a face, the device 105 may extract facial features such as the eyes, the nose, and the mouth. The device 105 may identify the position and size of the extracted features. At 420, the device 105 may use the information associated with extracting the target features (e.g., the position and size of the extracted features) to generate a weight map of the feature region and estimate the direction of one or more features of the feature region and/or the feature region. In some cases, the direction of the one or more feature and/or the feature region may be estimated based on a geometric relationship between one or more features of the feature region. The device 105 may output one or more values such as a feature region weight map, an estimated direction of the feature region, a direction weight map, or any combination thereof.

At 425, the device 105 may identify the focus position of the image based on the feature region weight map, the estimated direction of the feature region, the direction weight map, or any combination thereof. In some cases, an autofocus controller of the device 105 may identify the focus position of the image based on a combined weight map that is generated based on the feature region weight map and the direction weight map (e.g., by multiplying the feature region weight map and the direction weight map). The autofocus controller may use this combined weight map to assign larger weights to strong features of the image, which may support the device 105 in identifying a focus position that improves the quality of the feature region by increasing the influence that the target features have on the focus position.

Figure 5:
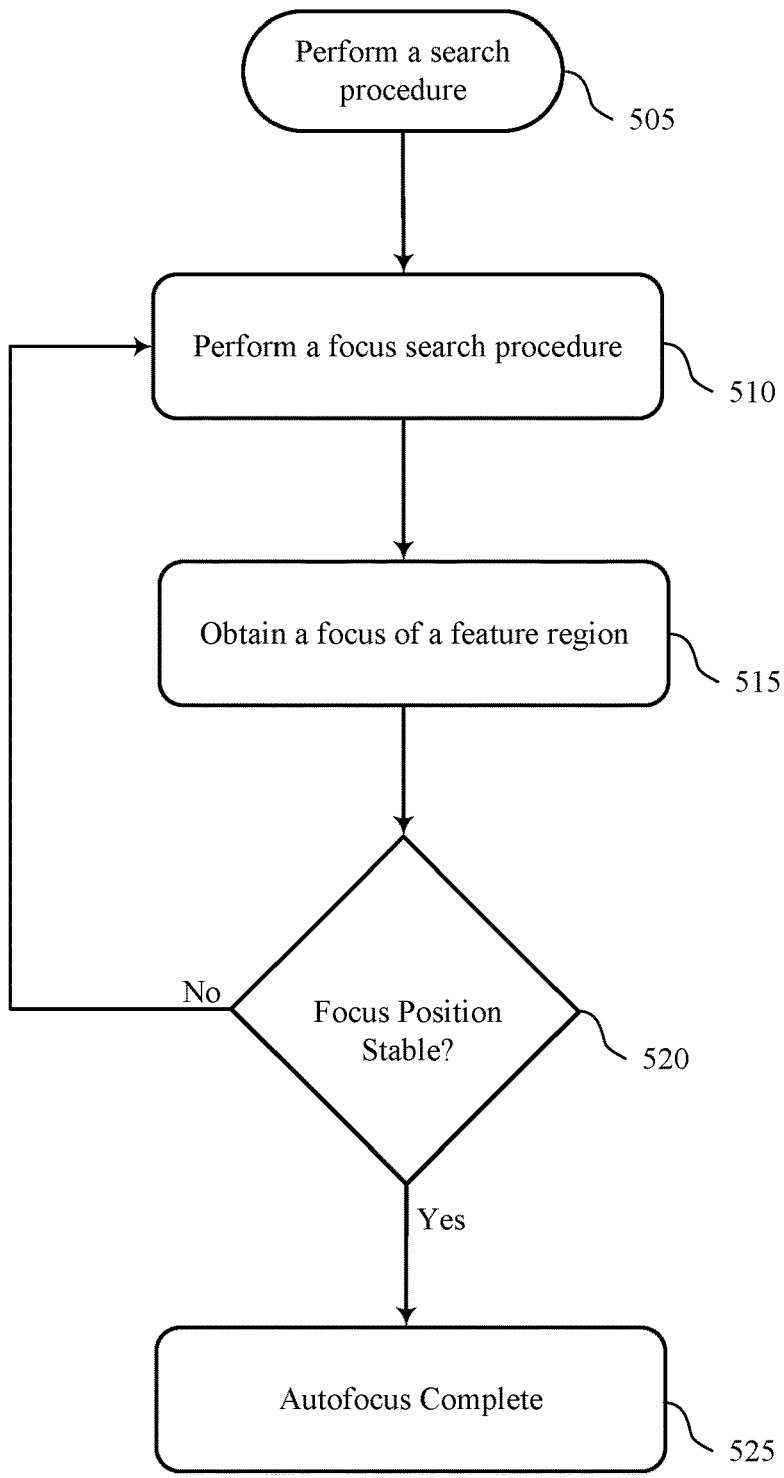
FIG. 5 illustrates an example of a flow diagram that supports feature-based image autofocus in accordance with aspects of the present disclosure.

FIG. 5 illustrates an example of a flow diagram 500 that supports feature-based image autofocus in accordance with aspects of the present disclosure. The flow diagram 500 may correspond to a feature-based autofocus procedure. In some examples, the flow diagram 500 may implement aspects of the multimedia system 100. The operation of the flow diagram 500 may be implemented by a device 105 or its components (e.g., one or more image processors, one or more image memory devices, one or more lens motors, one or more image sensor motors, or any combination thereof) as described herein. The device 105 may execute a set of instructions to control the functional elements of the device 105 to perform the operations described below. Additionally or alternatively, the device 105 may perform aspects of the operations described below using special-purpose hardware. Alternative examples of the following may be implemented, where some operations are performed in a different order than described or are not performed at all. In some cases, operations may include additional features not mentioned below, or further operations may be added.

At 505, the device 105 may perform a search procedure, which may include identifying an image for an autofocus procedure, identifying a feature region of the image, extracting one or more target features of the feature region, and evaluating one or more positions of the target features to determine an orientation and/or direction of the feature region. The search procedure may include modifying (e.g., extending) the feature region based on the direction of the feature region. In some cases, the device 105 may generate a feature weight map based on the target features of the feature region.

At 510, the device 105 may perform a focus search procedure based on the feature weight map and the direction of the feature region. The device 105 may calculate a focus portion of the feature region based on the feature weight map and/or the direction of the feature region. In some cases, the device 105 may calculate the focus position based on a contrast focus procedure, a phase detection focus procedure, a time-of-flight focus procedure, or any combination thereof. Additionally or alternatively, the focus position may be updated with the feature weight map for each stage in a series of search stages.

At 515, the device 105 may obtain the focus of the feature region (e.g., the region of interest). The focus may be based on adjusting the focus value based on the feature weight map and/or the direction of the feature region. In some cases, the focus of the feature region may be based on eye-tracking. For example, the feature weight map may identify eye features of the feature region and increase the weight the eye features, which may yield an image focus position with clear eyes. At 520, the device 105 may determine whether the focus position is stable. If the position is not stable, the device 105 may repeat performing the search operation, at 510. If the position is stable, the feature-based autofocus procedure may be complete.

Figure 6:
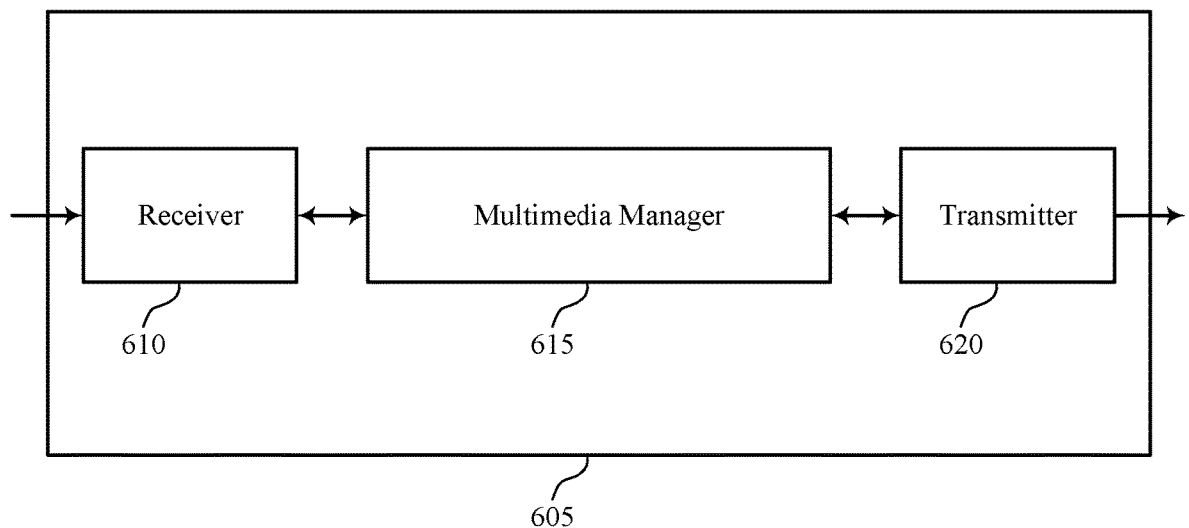
FIGS. 6 and 7 show block diagrams of devices that support feature-based image autofocus in accordance with aspects of the present disclosure.

FIG. 6 shows a block diagram 600 of a device 605 that supports feature-based image autofocus in accordance with aspects of the present disclosure. The device 605 may be an example of aspects of a device as described herein. The device 605 may include a receiver 610, a multimedia manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to feature-based image autofocus, etc.). Information may be passed on to other components of the device 605. The receiver 610 may be an example of aspects of the transceiver 920 described with reference to FIG. 9. The receiver 610 may utilize a single antenna or a set of antennas.

The multimedia manager 615 may determine a set of features based on determining a feature region associated with the image, generate a feature weight map based on the set of features, estimate a direction of a target feature in the feature region based on the feature region, determine a focus position of the image based on the generated feature weight map and the estimated direction of the target feature, and perform an autofocus operation on the determined focus position of the image. The multimedia manager 615 may be an example of aspects of the multimedia manager 910 described herein.

The multimedia manager 615 may be implemented as an integrated circuit or chipset for the device 605 modem, and the receiver 610 and the transmitter 620 may be implemented as analog components (for example, amplifiers, filters, antennas) coupled with the device 605 modem to enable multimedia transmission and reception. The multimedia manager 615 may be implemented to realize one or more potential improvements. At least one implementation may enable the multimedia manager 615 to provide improvements to autofocus operations on an image by estimating a feature direction (e.g., a face direction, an object direction) based on one or more features (e.g., facial features, object features) of a target feature. Based on implementing the improvements to the autofocus operations on the image, one or more processors of the device 605 (for example, processor(s) controlling or incorporated with the multimedia manager 615) may promote high reliability and low latency autofocus operations, among other benefits.

The multimedia manager 615, or its sub-components, may be implemented in hardware, code (e.g., software or firmware) executed by a processor, or any combination thereof.

If implemented in code executed by a processor, the functions of the multimedia manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The multimedia manager 615, or its sub-components, may be physically located at various positions, including being distributed such that portions of functions are implemented at different physical locations by one or more physical components. In some examples, the multimedia manager 615, or its sub-components, may be a separate and distinct component in accordance with various aspects of the present disclosure. In some examples, the multimedia manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
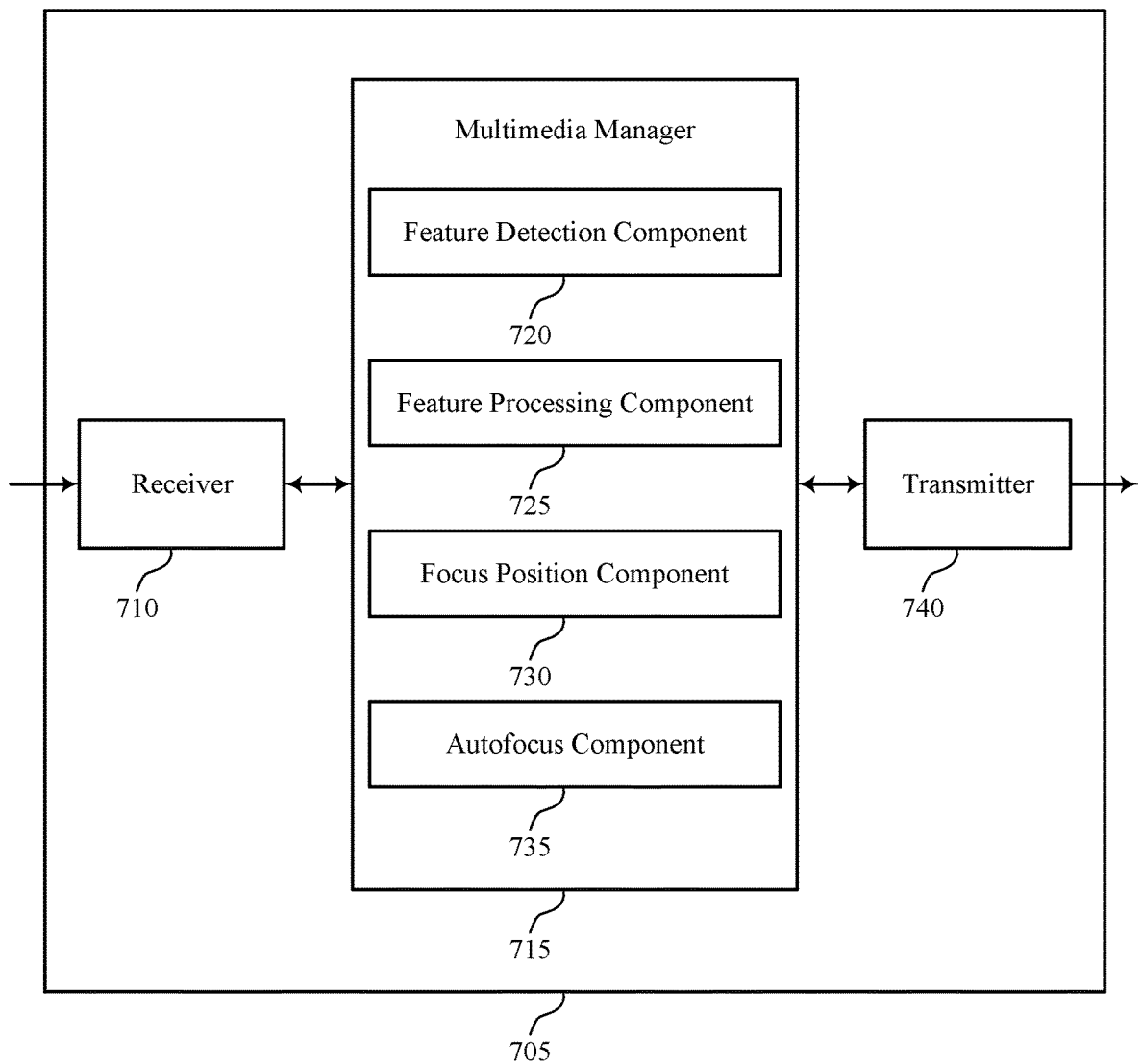

FIG. 7 shows a block diagram 700 of a device 705 that supports feature-based image autofocus in accordance with aspects of the present disclosure. The device 705 may be an example of aspects of a device 605 or a device 105 as described herein. The device 705 may include a receiver 710, a multimedia manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to feature-based image autofocus, etc.). Information may be passed on to other components of the device 705. The receiver 710 may be an example of aspects of the transceiver 920 described with reference to FIG. 9. The receiver 710 may utilize a single antenna or a set of antennas.

The multimedia manager 715 may be an example of aspects of the multimedia manager 615 as described herein. The multimedia manager 715 may include a feature detection manager 720, a feature processing manager 725, a focus position manager 730, and a multimedia manager 735. The multimedia manager 715 may be an example of aspects of the multimedia manager 910 described herein.

The feature detection manager 720 may determine a set of features based on determining a feature region associated with an image. The feature processing manager 725 may generate a feature weight map based on the set of features and estimate a direction of a target feature in the feature region based on the feature region. The focus position manager 730 may determine a focus position of the image based on the generated feature weight map and the estimated direction of the target feature. The multimedia manager 735 may perform an autofocus operation on the determined focus position of the image.

The transmitter 740 may transmit signals generated by other components of the device 705. In some examples, the transmitter 740 may be collocated with a receiver 710 in a transceiver component. For example, the transmitter 740 may be an example of aspects of the transceiver 920 described with reference to FIG. 9. The transmitter 740 may utilize a single antenna or a set of antennas.

Figure 8:
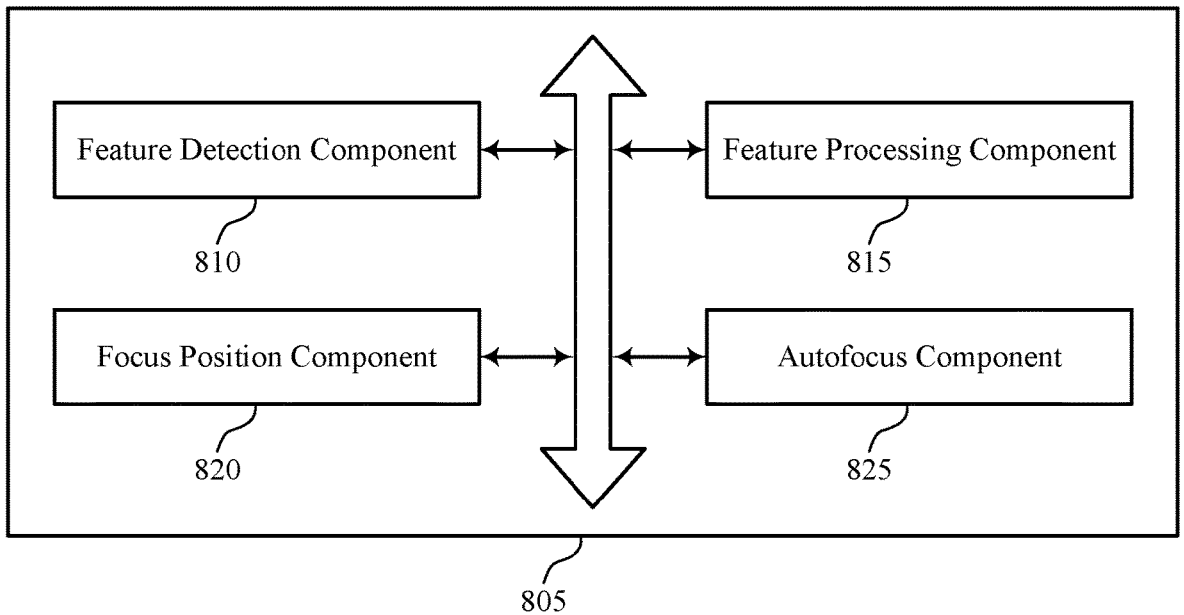
FIG. 8 shows a block diagram of a multimedia manager that supports feature-based image autofocus in accordance with aspects of the present disclosure.

FIG. 8 shows a block diagram 800 of a multimedia manager 805 that supports feature-based image autofocus in accordance with aspects of the present disclosure. The multimedia manager 805 may be an example of aspects of a multimedia manager 615, a multimedia manager 715, or a multimedia manager 910 described herein. The multimedia manager 805 may include a feature detection component 810, a feature processing component 815, a focus position component 820, and an autofocus component 825. Each of these components may communicate, directly or indirectly, with one another (e.g., via one or more buses).

The feature detection component 810 may determine a set of features based on determining a feature region associated with an image. The feature processing component 815 may generate a feature weight map based on the set of features. In some examples, the feature processing component 815 may estimate a direction of a target feature in the feature region based on the feature region. In some examples, the feature processing component 815 may calculate a geometric relationship between a first feature in the feature region and a second feature in the feature region, where estimating the direction of the target feature is based on the calculated geometric relationship between the first feature in the feature region and the second feature in the feature region. The feature processing component 815 may estimate the location of a third feature in the feature region based on the geometric relationship between the first feature in the feature region and the second feature in the feature region. In some examples, the feature processing component 815 may estimate the direction of the target feature-based on the estimated location of the third feature in the feature region.

The feature processing component 815 may determine the set of features based on a principal component analysis, a linear discriminant analysis, an elastic bunch graph matching, a dynamic link matching, a hidden Markov model, or an artificial neural network technique, or any combination thereof. In some cases, the geometric relationship includes a Euclidian distance, a Chebyshev distance, or a cosine similarity, any combination thereof. In some cases, the feature region includes an object or a person. In some cases, the set of features includes a set of facial features of a person and the set of facial features including a face of the person, one or more eyes of the person, a nose of the person, one or more ears of the person, a mouth of the person, or any combination thereof. In some cases, the set of features includes a set of object features of an object and the set of object features including a surface of the object, a shape of the object, or a size of the object, or any combination thereof. In some cases, the object includes a roadside object. In some cases, the feature includes a bounding box including the set of features in the image.

The focus position component 820 may determine a focus position of the image based on the generated feature weight map and the estimated direction of the target feature. In some examples, the focus position component 820 may calculate a focus value based on the feature weight map based on the determined focus position of the image. The focus position component 820 may perform a contrast autofocus operation or a phase-detection autofocus operation, or both, based on the set of features. In some examples, the focus position component 820 may calculate the focus value based on the contrast autofocus operation.

The focus position component 820 may update the feature region associated with the image based on the estimated direction of the target feature, where determining the focus position of the image is based on the updated feature region. The focus position component 820 may perform an auto white balance operation based on the set of features, where calculating the focus value is based on the auto white balance operation. The focus position component 820 may determine a presence of a facial feature or an object feature in the feature region associated with the image based on the auto white balance operation, the target feature including the facial feature or the object feature, where performing the auto white balance operation is based on the determined presence of the facial feature or the object feature in the feature region associated with the image. The multimedia manager 805 may perform an autofocus operation on the determined focus position of the image.

Figure 9:
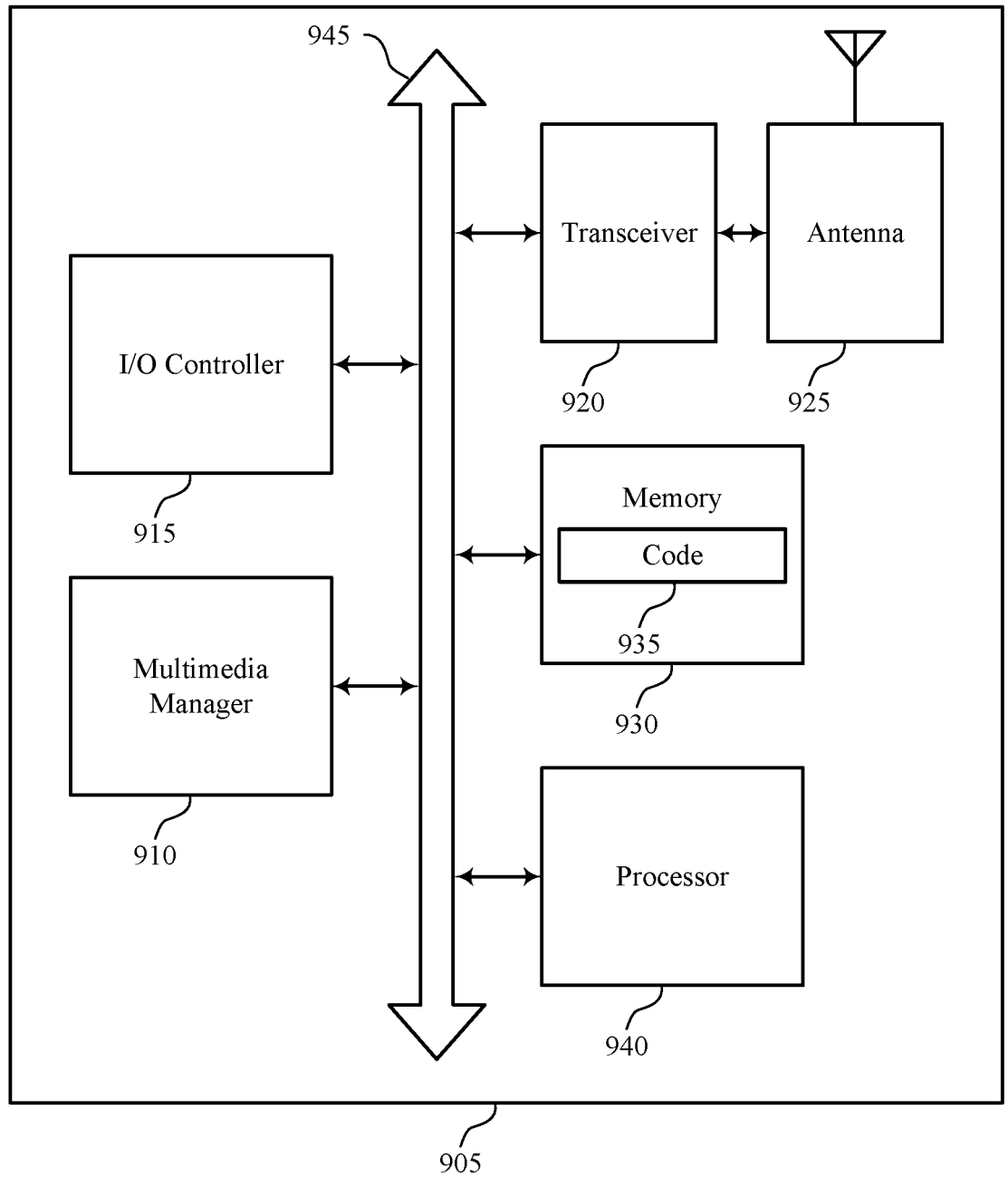
FIG. 9 shows a diagram of a system including a device that supports feature-based image autofocus in accordance with aspects of the present disclosure.

FIG. 9 shows a diagram of a system 900 including a device 905 that supports feature-based image autofocus in accordance with aspects of the present disclosure. The device 905 may be an example of or include the components of device 605, device 705, or a device as described herein. The device 905 may include components for bi-directional voice and data communications including components for transmitting and receiving communications, including a multimedia manager 910, an I/O controller 915, a transceiver 920, an antenna 925, memory 930, a processor 940, and a coding manager 950. These components may be in electronic communication via one or more buses (e.g., bus 945).

The multimedia manager 910 may determine a set of features based on determining a feature region associated with an image. The multimedia manager 910 may generate a feature weight map based on the set of features. The multimedia manager 910 may estimate a direction of a target feature in the feature region based on the feature region, and determine a focus position of the image based on the generated feature weight map and the estimated direction of the target feature. The multimedia manager 910 may, as a result, perform an autofocus operation on the determined focus position of the image. At least one implementation may enable the multimedia manager 910 to provide improvements to autofocus operations on an image by estimating a feature direction (e.g., a face direction, an object direction) based on one or more features (e.g., facial features, object features) of a target feature. Based on implementing the improvements to the autofocus operations on the image, one or more processors of the device 905 (for example, processor(s) controlling or incorporated with the multimedia manager 910) may experience reduce power consumption and promote high reliability and low latency autofocus operations, among other benefits.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the device 905 may include a single antenna 925. However, in some cases, the device 905 may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor 940 to perform various functions described herein. In some cases, the memory 930 may include, among other things, a BIOS which may control basic hardware or software operation such as the interaction with peripheral components or devices. The code 935 may include instructions to implement aspects of the present disclosure, including instructions to support image processing. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include a programmable hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting feature-based image autofocus).

Figure 10:
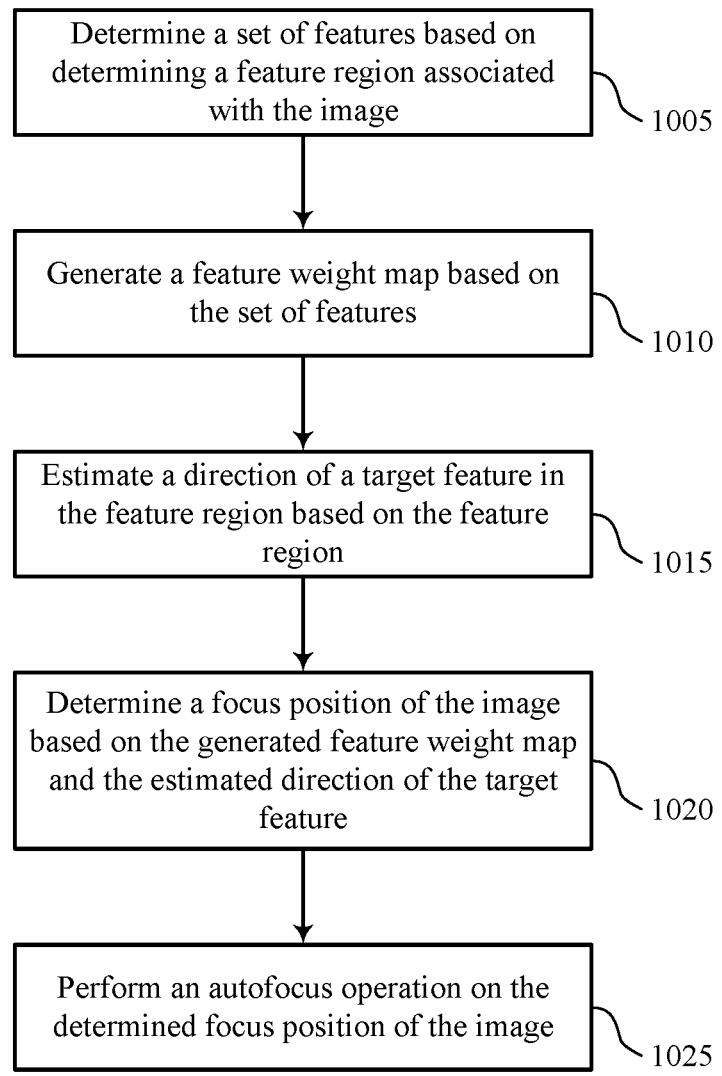
FIGS. 10 and 11 show flowcharts illustrating methods that support feature-based image autofocus in accordance with aspects of the present disclosure.

FIG. 10 shows a flowchart illustrating a method 1000 that supports feature-based image autofocus in accordance with aspects of the present disclosure. The operations of method 1000 may be implemented by a device or its components as described herein. For example, the operations of method 1000 may be performed by a multimedia manager as described with reference to FIGS. 6 through 9. In some examples, a device may execute a set of instructions to control the functional elements of the device to perform the functions described below. Additionally or alternatively, a device may perform aspects of the functions described below using special-purpose hardware.

At 1005, the device may determine a set of features based on determining a feature region associated with an image. The operations of 1005 may be performed according to the methods described herein. In some examples, aspects of the operations of 1005 may be performed by a feature detection manager as described with reference to FIGS. 6 through 9.

At 1010, the device may generate a feature weight map based on the set of features. The operations of 1010 may be performed according to the methods described herein. In some examples, aspects of the operations of 1010 may be performed by a feature processing manager as described with reference to FIGS. 6 through 9.

At 1015, the device may estimate a direction of a target feature in the feature region based on the feature region. The operations of 1015 may be performed according to the methods described herein. In some examples, aspects of the operations of 1015 may be performed by a feature processing manager as described with reference to FIGS. 6 through 9.

At 1020, the device may determine a focus position of the image based on the generated feature weight map and the estimated direction of the target feature. The operations of 1020 may be performed according to the methods described herein. In some examples, aspects of the operations of 1020 may be performed by a focus position manager as described with reference to FIGS. 6 through 9.

At 1025, the device may perform an autofocus operation on the determined focus position of the image. The operations of 1025 may be performed according to the methods described herein. In some examples, aspects of the operations of 1025 may be performed by a multimedia manager as described with reference to FIGS. 6 through 9.

Figure 11:
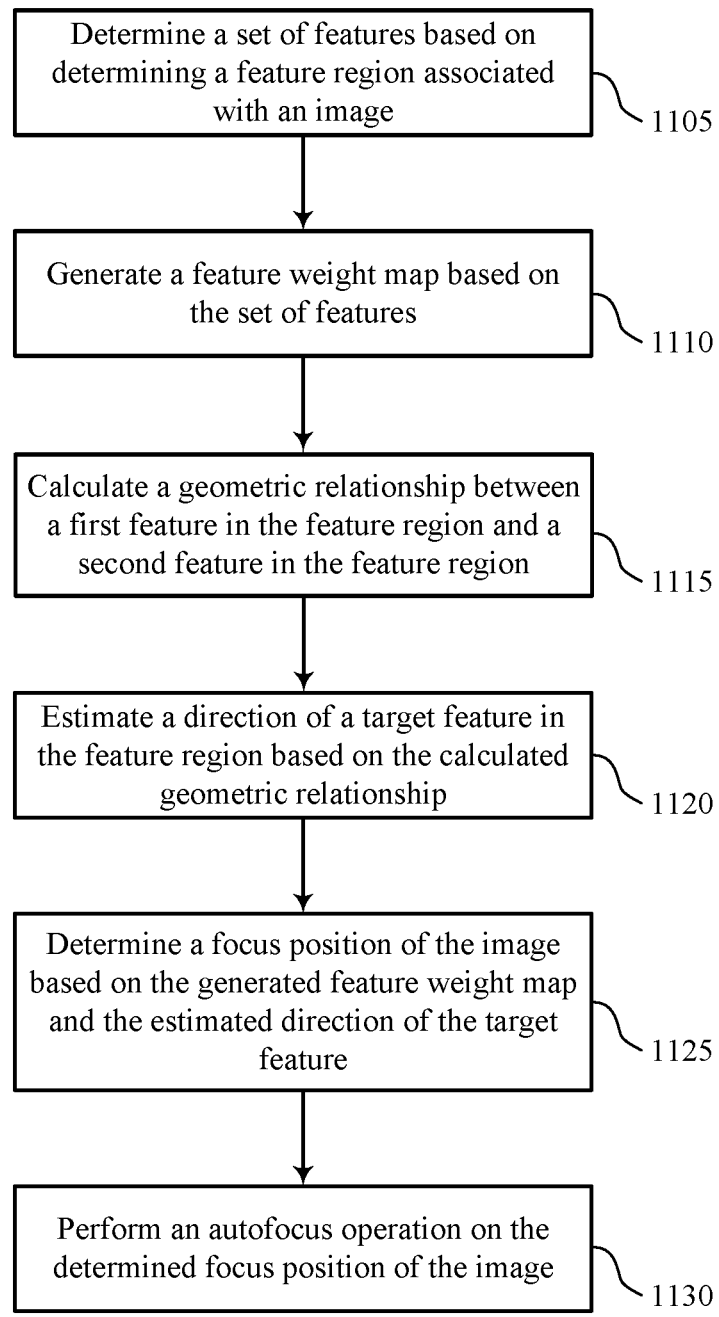

FIG. 11 shows a flowchart illustrating a method 1100 that supports feature-based image autofocus in accordance with aspects of the present disclosure. The operations of method 1100 may be implemented by a device or its components as described herein. For example, the operations of method 1100 may be performed by a multimedia manager as described with reference to FIGS. 6 through 9. In some examples, a device may execute a set of instructions to control the functional elements of the device to perform the functions described below. Additionally or alternatively, a device may perform aspects of the functions described below using special-purpose hardware.

At 1105, the device may determine a set of features based on determining a feature region associated with an image. The operations of 1105 may be performed according to the methods described herein. In some examples, aspects of the operations of 1105 may be performed by a feature detection manager as described with reference to FIGS. 6 through 9.

At 1110, the device may generate a feature weight map based on the set of features. The operations of 1110 may be performed according to the methods described herein. In some examples, aspects of the operations of 1110 may be performed by a feature processing manager as described with reference to FIGS. 6 through 9.

At 1115, the device may calculate a geometric relationship between a first feature in the feature region and a second feature in the feature region. The operations of 1115 may be performed according to the methods described herein. In some examples, aspects of the operations of 1115 may be performed by a feature processing manager as described with reference to FIGS. 6 through 9.

At 1120, the device may estimate a direction of a target feature in the feature region based on the calculated geometric relationship. The operations of 1120 may be performed according to the methods described herein. In some examples, aspects of the operations of 1120 may be performed by a feature processing manager as described with reference to FIGS. 6 through 9.

At 1125, the device may determine a focus position of the image based on the generated feature weight map and the estimated direction of the target feature. The operations of 1125 may be performed according to the methods described herein. In some examples, aspects of the operations of 1125 may be performed by a focus position manager as described with reference to FIGS. 6 through 9.

At 1130, the device may perform an autofocus operation on the determined focus position of the image. The operations of 1130 may be performed according to the methods described herein. In some examples, aspects of the operations of 1130 may be performed by a multimedia manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for autofocus at a device, comprising:
   determining a set of features based at least in part on determining a feature region associated with an image;
   generating a feature weight map based at least in part on the set of features;
   estimating a direction of a target feature in the feature region based at least in part on the feature region;
   determining a focus position of the image based at least in part on the generated feature weight map and the estimated direction of the target feature; and
   performing an autofocus operation on the determined focus position of the image.

2. The method of claim 1, further comprising:
   calculating a focus value based at least in part on the feature weight map, wherein determining the focus position comprises:
   determining the focus position of the image based at least in part on the calculated focus value.

3. The method of claim 2, further comprising:
   performing a contrast autofocus operation or a phase-detection autofocus operation, or both, based at least in part on the set of features, wherein calculating the focus value comprises:
   calculating the focus value based at least in part on the contrast autofocus operation or the phase-detection autofocus operation, or both.

4. The method of claim 1, further comprising:
   calculating a geometric relationship between a first feature in the feature region and a second feature in the feature region, wherein estimating the direction of the target feature comprises:
   estimating the direction of the target feature in the feature region based at least in part on the geometric relationship between the first feature in the feature region and the second feature in the feature region, wherein the first feature is different from the second feature.

5. The method of claim 4, wherein the geometric relationship comprises a Euclidian distance, a Chebyshev distance, or a cosine similarity, any combination thereof.

6. The method of claim 4, further comprising:
   estimating the location of a third feature in the feature region based at least in part on the geometric relationship between the first feature in the feature region and the second feature in the feature region, wherein estimating the direction of the target feature comprises:
   estimating the direction of the target feature in the feature region based at least in part on the location of the third feature in the feature region.

7. The method of claim 1, further comprising:
   updating the feature region associated with the image based at least in part on the estimated direction of the target feature, wherein determining the focus position of the image comprises:
   determining the focus position of the image based at least in part on the updated feature region.

8. The method of claim 1, further comprising:
   performing an auto white balance operation based at least in part on the set of features, wherein calculating the focus value comprises:
   calculating the focus value based at least in part on the auto white balance operation.

9. The method of claim 8, further comprising:
   determining a presence of a facial feature or an object feature in the feature region associated with the image based at least in part on the auto white balance operation, the target feature comprising the facial feature or the object feature, wherein performing the auto white balance operation comprises:
   performing the auto white balance operation based at least in part on the presence of the facial feature or the object feature in the feature region.

10. The method of claim 1, wherein the feature region comprises an object or a person.

11. The method of claim 1, wherein the set of features comprises a set of facial features of a person and the set of facial features comprising a face of the person, one or more eyes of the person, a nose of the person, one or more ears of the person, a mouth of the person, or any combination thereof.

12. The method of claim 1, wherein the set of features comprises a set of object features of an object and the set of object features comprising a surface of the object, a shape of the object, or a size of the object, or any combination thereof.

13. The method of claim 1, wherein the object comprises a roadside object.

14. The method of claim 1, wherein the feature comprises a bounding box including the set of features in the image.

15. The method of claim 1, wherein determining the set of features comprises:
- determining the set of features based at least in part on a principal component analysis, a linear discriminant analysis, an elastic bunch graph matching, a dynamic link matching, a hidden Markov model, or an artificial neural network technique, or any combination thereof.

16. An apparatus for autofocus, comprising:
- a processor;
- memory coupled with the processor; and
- instructions stored in the memory and executable by the processor to cause the apparatus to:
  - determine a set of features based at least in part on determining a feature region associated with an image;
  - generate a feature weight map based at least in part on the set of features;
  - estimate a direction of a target feature in the feature region based at least in part on the feature region;
  - determine a focus position of the image based at least in part on the generated feature weight map and the estimated direction of the target feature; and
  - perform an autofocus operation on the determined focus position of the image.

17. The apparatus of claim 16, wherein the instructions are further executable by the processor to cause the apparatus to:
- calculate a focus value based at least in part on the feature weight map, wherein the instructions to determine the focus position are further executable by the processor to cause the apparatus to:
- determine the focus position of the image based at least in part on the calculated focus value.

18. The apparatus of claim 17, wherein the instructions are further executable by the processor to cause the apparatus to:
- perform a contrast autofocus operation or a phase-detection autofocus operation, or both, based at least in part on the set of features, wherein the instructions to calculate the focus value are further executable by the processor to cause the apparatus to:
- calculate the focus value based at least in part on the contrast autofocus operation or the phase-detection autofocus operation, or both.

19. The apparatus of claim 16, wherein the instructions are further executable by the processor to cause the apparatus to:
- calculate a geometric relationship between a first feature in the feature region and a second feature in the feature region, wherein the instructions to estimate the direction of the target feature are further executable by the processor to cause the apparatus to:
- estimate the direction of the target feature in the feature region based at least in part on the geometric relationship between the first feature in the feature region and the second feature in the feature region, wherein the first feature is different from the second feature.

20. An apparatus for autofocus, comprising:
- means for determining a set of features based at least in part on determining a feature region associated with an image;
- means for generating a feature weight map based at least in part on the set of features;
- means for estimating a direction of a target feature in the feature region based at least in part on the feature region;
- means for determining a focus position of the image based at least in part on the generated feature weight map and the estimated direction of the target feature; and
- means for performing an autofocus operation on the determined focus position of the image.

* * * * *